United States Patent
Carrasco

(10) Patent No.: US 8,607,301 B2
(45) Date of Patent: Dec. 10, 2013

(54) DEPLOYING GROUP VPNS AND SECURITY GROUPS OVER AN END-TO-END ENTERPRISE NETWORK

(75) Inventor: Serge-Paul Carrasco, Menlo Park, CA (US)

(73) Assignee: Certes Networks, Inc., Pittsburgh, PA (US)

( * ) Notice: Subject to any disclaimer, the term of this patent is extended or adjusted under 35 U.S.C. 154(b) by 1066 days.

(21) Appl. No.: 11/529,560

(22) Filed: Sep. 27, 2006

(65) Prior Publication Data

US 2008/0127327 A1    May 29, 2008

(51) Int. Cl.
*H04L 29/06* (2006.01)
*H04L 9/08* (2006.01)
*G06F 15/16* (2006.01)

(52) U.S. Cl.
CPC ...... *H04L 9/08* (2013.01); *H04L 63/20* (2013.01); *H04L 63/08* (2013.01); *H04L 63/0272* (2013.01)
USPC ............... 726/1; 726/4; 726/15; 380/278

(58) Field of Classification Search
None
See application file for complete search history.

(56) References Cited

U.S. PATENT DOCUMENTS

| | | | |
|---|---|---|---|
| 5,237,611 A | 8/1993 | Rasmussen et al. | |
| 5,577,209 A | 11/1996 | Boyle et al. | |
| 5,898,784 A | 4/1999 | Kirby et al. | |
| 5,940,591 A | 8/1999 | Boyle et al. | |
| 6,035,405 A | 3/2000 | Gage et al. | |
| 6,061,600 A | 5/2000 | Ying | |
| 6,173,399 B1 | 1/2001 | Gilbrech | |
| 6,275,859 B1 | 8/2001 | Wesley et al. | |
| 6,330,562 B1 | 12/2001 | Boden et al. | |
| 6,484,257 B1 | 11/2002 | Ellis | |
| 6,556,547 B1 | 4/2003 | Srikanth et al. | |
| 6,591,150 B1 | 7/2003 | Shirota | |
| 6,658,114 B1 | 12/2003 | Farn et al. | |
| 6,697,857 B1 | 2/2004 | Dixon et al. | |
| 6,711,679 B1 | 3/2004 | Guski et al. | |
| 6,823,462 B1 | 11/2004 | Cheng et al. | |
| 6,915,437 B2 | 7/2005 | Swander et al. | |
| 6,920,559 B1 | 7/2005 | Nessett et al. | |
| 6,981,139 B2 | 12/2005 | Enokida | |
| 6,986,061 B1 | 1/2006 | Kunzinger | |
| 7,103,784 B1 | 9/2006 | Brown et al. | |
| 7,373,660 B1 * | 5/2008 | Guichard et al. | ............... 726/15 |
| 7,509,491 B1 * | 3/2009 | Wainner et al. | ............... 713/163 |
| 7,594,264 B2 * | 9/2009 | Meyers et al. | ................. 726/21 |
| 2002/0067725 A1 | 6/2002 | Oguchi et al. | |

(Continued)

OTHER PUBLICATIONS

Frankel, S. "Demystifying the IPsec Puzzle," *Artech House*, Ch. 5, pp. 87-127, Ch. 9, pp. 179-205 (2001).

(Continued)

*Primary Examiner* — Matthew Henning
(74) *Attorney, Agent, or Firm* — Hamilton, Brook, Smith & Reynolds, P.C.

(57) ABSTRACT

Group Virtual Private Networks (Group VPNS) are provided for different types of machines in a data processing network. Security groups are defined by a security policy for each member. Security policies and encryption keys are deployed to members of a security group using an IPSec network infrastructure with authentication via VPN mechanisms. The group VPNs provide a trusted IP network that can leverage and co-exist with security access control technologies, such as endpoint security that controls client network access or application security that controls user access to enterprise applications.

26 Claims, 7 Drawing Sheets

(56) References Cited

U.S. PATENT DOCUMENTS

| | | | |
|---|---|---|---|
| 2002/0129271 A1* | 9/2002 | Stanaway et al. | 713/201 |
| 2002/0154782 A1 | 10/2002 | Chow et al. | |
| 2002/0162026 A1 | 10/2002 | Neuman et al. | |
| 2003/0135753 A1 | 7/2003 | Batra | |
| 2003/0191937 A1 | 10/2003 | Balissat et al. | |
| 2004/0005061 A1 | 1/2004 | Buer et al. | |
| 2004/0044891 A1 | 3/2004 | Hanzlik et al. | |
| 2004/0062399 A1 | 4/2004 | Takase | |
| 2004/0160903 A1 | 8/2004 | Gai et al. | |
| 2004/0210320 A1* | 10/2004 | Pandya | 700/1 |
| 2004/0268124 A1 | 12/2004 | Narayanan | |
| 2005/0010765 A1 | 1/2005 | Swander et al. | |
| 2005/0066159 A1 | 3/2005 | Poussa et al. | |
| 2005/0125684 A1 | 6/2005 | Schmidt | |
| 2005/0138369 A1 | 6/2005 | Lebovitz et al. | |
| 2005/0149732 A1 | 7/2005 | Freeman et al. | |
| 2005/0190758 A1 | 9/2005 | Gai et al. | |
| 2006/0072748 A1 | 4/2006 | Buer | |
| 2006/0072762 A1 | 4/2006 | Buer | |
| 2006/0187942 A1 | 8/2006 | Mizutani et al. | |
| 2006/0198368 A1* | 9/2006 | Guichard et al. | 370/389 |
| 2007/0186281 A1* | 8/2007 | McAlister | 726/14 |
| 2008/0040775 A1* | 2/2008 | Hoff et al. | 726/1 |
| 2008/0083011 A1* | 4/2008 | McAlister et al. | 726/1 |
| 2009/0100514 A1* | 4/2009 | Jin et al. | 726/15 |

OTHER PUBLICATIONS

International Search Report of the International Search Authority issued Jun. 17, 2008, in corresponding PCT Application No. PCT/US2007/020811, 2 pages.

International Preliminary Report on Patentability, with Written Opinion, issued on Mar. 31, 2009, in corresponding PCT Application No. PCT/US2007/020811, 7 pages.

* cited by examiner

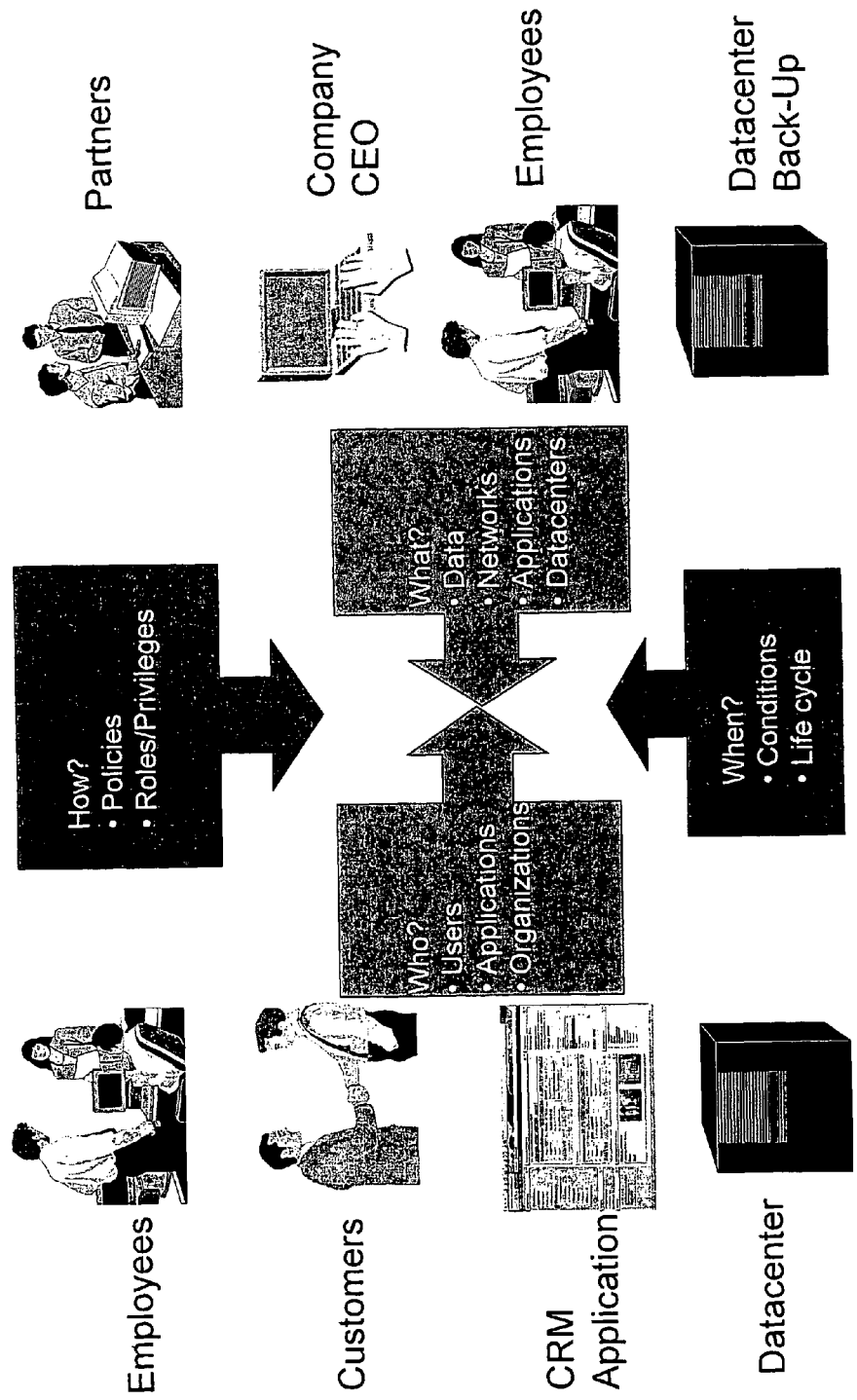

DEPLOYING GROUP VPNS AND SECURITY GROUPS OVER AN END-TO-END ENTERPRISE NETWORK

BACKGROUND OF THE INVENTION

The present invention relates to how enterprise networks can create (internally or with their external service provider partners) Virtual Private Networks (VPNs) for different groups of clients and/or host applications, referred to herein as Group VPNs.

Enterprise networks often require different types of functional and/or organizational groups of users. Within the enterprise network, those groups have different privacy requirements for their Internet Protocol (IP) communication between their client users and/or between their client users and their host applications.

Present Network Data Protection Solutions

Most of the time, network traffic is sent "in the clear", unsecured without encryption or authentication of the sender and receiver. In order to allow private traffic to be sent in a secure manner, a number of security schemes have been proposed and are in use today. Some are application dependent, such as a specific program performing password authentication. Others, such as Security Socket Layer/Transport Layer Security (SSL/TLS), are designed to provide comprehensive security to specific classes of traffic such as Web traffic.

IPSec, as defined in RFC 2401, can work in tunnel mode by encrypting a data packet (if encryption is required since IPSec can be used for authentication only), performing a secure hash (or authentication) on the packet, then wrapping the resulting packet in a new IP packet with a new header indicating it has been secured using IPSec.

The two endpoints where data protection through encryption is enforced are called Policy Enforcement Points (PEPs). The two PEPs must establish the IPSec security services through a Security Association (SA) and in particular, the encryption keys. This is can be accomplished using the Internet Key Exchange (IKE) protocol, as defined in RFC 2409 (or RFC 4206 for its version 2), that negotiates keys in two phases: the first phase is used to secure a communication channel between the two PEPs; the second phase is used to create two unidirectional IPSec SAs. Traffic can now be encrypted based on the IPSec policy that defines the type of traffic to be protected between two identified IP addresses or subnets.

Limitations When Securing Networks with IPSec

While IPSec secures IP traffic at the network layer, key exchange mechanisms create a number of practical limitations when IPSec is deployed in networks.

Manual keys are not generally used because of the configuration challenges and re-key requirements to implement them in large networks. For those reasons, IKE is normally used for key exchange. However, IKE is based on a secure connection being established between two PEPs and a resulting key negotiation being completed between those two PEPs. As a result, this connection-oriented nature of IKE has a few drawbacks.

If the traffic needs to be sent and/or received through multiple paths, as would be the case in a resilient network, there is no single pair of points that can be identified to perform key negotiation and no single PEP that can be selected as the ultimate destination in the IPSec tunnel header.

Finding a Balance Between Data Protection and Access Control

In an enterprise network, data availability enables business productivity. However, the availability of enterprise data requires managing the business risks associated with that availability. Data that is secured, but not available to users is worthless. Data that is accessed by users, but is unsecured is at risk. The challenge is to find the right balance between data protection and data availability.

Generally in an enterprise, different types of data are accessed by different types of users or groups. For example, users of the same business unit or the same organizational group such as engineering or finance might need to access the same data concurrently. Different business units or different organizational groups have different security requirements. Generally, protection of data for a financial or a legal department is somewhat different than data protection for a marketing or engineering department. In addition, some group transactions such as financial transactions might be secure, while other group transactions such as administrative information might be in the clear.

Connectivity in Networks with Complex Boundaries

If organizational flow charts are usually informally or formally known within an enterprise, the various network links that establishes the data communication paths between client users and application data are generally more difficult to establish for network administrators.

Large enterprise networks have more and more complex physical and logical boundaries inside a building or across remote buildings, campuses or countries. Large enterprise networks also have complex physical and logical boundaries between internal, remote and external users of enterprise applications.

Therefore, provisioning any management functions, in particular security functions, that might affect various users of the same group is somewhat challenging. Even if it is easy to identify the members of the group, it is much more difficult to discover their physical communication paths for large scale networks.

SUMMARY OF THE INVENTION

With the present state of the art, there is no way to enable different IPSec encryption of data between two given IP addresses. Currently there is no solution for an enterprise network to implement different network data protection schemes needed for different types of user clients or application hosts.

Furthermore, enterprise networks would prefer to leverage the same security infrastructure across different types of users and applications to lower their capital and operating expenses and across their various network boundaries.

The present invention gives precedence to the deployment over an enterprise network of Group Virtual Private Networks (VPNs) for different types of groups, called security groups, defined by a security policy for the members of a group. Group VPN enables the deployment of security policies and encryption keys to members of a security group using the same IP Security (IPSec) VPN network infrastructure. With Group VPN, enterprises are able to securely partition an enterprise network from end-to-end. Group VPN also provides an internal trusted network that can leverage and coexist with network access control technologies. Access control technologies only allow trusted users and clients access to the applications.

In particular, each group, referred to as a security group, is defined by a security policy. According to that security policy, encryption keys are generated and distributed among the various members of the group. The Virtual Private Network (VPN) or enterprise data protected network secures Internet Protocol (IP) payload generated by the clients and/or host applications using IP Security (IPSec). Security groups are allowed over the same data protection infrastructure. Security groups provide a trusted IP network that can leverage and co-exist with security access control technologies, such as endpoint security that controls client network access or application security that controls user access to enterprise applications.

Network Overlay of Security Policies and Encryption Keys to the Data Plane

More particularly, by dividing the generation and distribution of security policies and encryption keys into separate components and combining them in new ways across multiple devices, the fundamental connection-oriented approach of IPSec using IKE can be changed while maintaining most of its present features and all of its security capabilities. This approach can solve the present IPSec/IKE point-to-point limitations to completely secure network traffic over point-to-multipoint and multipoint-to-multipoint networks that are the ways that IP networks are designed.

This new three-layer approach to the deployment of the IPSec includes the following functional components:

PEP: The PEP devices still exist in the network to protect traffic, but rather than exchanging keys on a one-to-one basis using IKE with other PEPs, they receive their SAs externally from a centralized Key Authority Point (KAP) entity.

Key Authority Point (KAP): According to the security policies, the KAP generates SAs and encryption keys and then distributes them to the PEP units and peer KAP devices.

Management and Policy Server (MAP): The MAP generates the security policies and distributes them to the KAP servers.

Generation and Distribution of Security Policies and Encryption Keys

The PEPs are deployed at various points in the enterprise networks that need secure tunnels. Each PEP is associated with a number of network sets that define a collection of networks identified by their IP addresses and their subnets. A policy can be defined for the network sets associated with each PEP that protects those networks. The KAP could be configured with the policies from the MAP and distributes those policies and SAs to the PEPs. The KAP generates a single outbound key for each PEP policy and its associated network sets and distributes it securely to the PEPs. For those remote peer PEPs that key would become the inbound key. A KAP on each site can share its outbound keys with each KAP on the other sites for each policy. Each PEP network set can receive its pair of inbound and outbound keys per policy from its associated KAP. PEPs encrypt traffic using IPSec Encrypting Security Payload (ESP) from network to network.

Traffic through the PEPs is essentially the same as traffic through any other IPSec gateways except that on outbound traffic, the source and destination IP addresses are maintained from the original and unencrypted packet. In other words, the initial IP address is preserved from encryption.

Additional information about the details of the generation and distribution of security policies and encryption keys are incorporated by the following co-pending U.S. patent applications, all of which are assigned to CiperOptics, Inc., the assignee of the present application, and all of which are hereby incorporated by reference in their entirety:

U.S. Provisional Patent Application No. 60/756,765 entitled SECURING NETWORK TRAFFIC USING DISTRIBUTED KEY GENERATION AND DISSEMINATION OVER SECURE TUNNELS, filed Jan. 6, 2006, which describes how an IP header of an outgoing packet is copied into an outer header of an IPsec tunnel mode packet;

U.S. Provisional Patent Application No. 60/813,766 entitled SECURING NETWORK TRAFFIC BY DISTRIBUTING POLICIES IN A HIERARCHY OVER SECURE TUNNELS, filed Jun. 14, 2006, which describes how to distribute security policies using tunnels; and U.S. Provisional Patent Application No. 60/837,410 entitled ENFORCING SECURITY GROUPS IN A NETWORK OF DATA PROCESSORS filed Aug. 11, 2006, which describes a service layer approach to implementing group security functions.

Deploying Group VPNs and Creating Security Groups

Leveraging this architecture for the generation and distribution of security policies and encryption keys, enterprise networks can deploy multiple Group VPNs inside their boundaries. A Group VPN provides a secure virtualized network for a given security group. Internal and/or external enterprise users and resources are logically partitioned based on their memberships to a security group. Network traffic within corporate LANs and between sites/hubs is protected within virtualized security groups. A security group defines networks that can be accessed by a certain type of clients and/or applications.

Security group types can include:

User clients to user clients (defined by subnets/IP addresses to subnets/IP addresses for the IPSec encryption);

Clients to host applications/datacenters (defined by subnets/IP addresses to IP addresses); and, Applications/datacenters to applications/datacenters (defined by IP addresses to IP addresses).

A client or an application can belong to more than one security group.

When identification of the security groups is established, security policies can be created, "per group," by the MAP and distributed to the KAPs. Each KAP negotiates the encryption keys associated with the security group policies with its peer KAP. The KAP then distributes the keys to its associated PEPs.

Large enterprise networks covering multiple remote sites and/or distributed over multiple countries can use a network of distributed MAPs, such as one per site, instead of implementing a centralized MAP. In that case, administrator knowledge of the security group requirements can be limited to his or her site administration responsibilities.

Additional information about the details of the generation and distribution of security policies and encryption keys are contained in the patents incorporated by reference above.

Integrating Group VPN with Endpoint and Application Security

Network access of the members of a security group can leverage endpoint access control solutions. The client is authenticated via the LAN switching infrastructure, implementing the IEEE 802.1x and the Extensible Authentication Protocols (EAP) by the access control server using RADIUS or any other server authentication method.

If remediation is required, the client accesses the remediation server. When the client is allowed to access the network, its PEP receives its security group membership with its security policies and encryption keys from the MAP through the KAP. The PEP may be integrated to the client or be an external device.

A number of emerging technologies that does not require software agents at the client, such as virtual machines that can isolate clients, or extensions to Dynamic Host Configuration Protocol (DHCP) that can re-route client access to an isolated LAN, are other alternatives to client authentication using 802.1x and EAP.

Whether the authentication mechanism for the client requires a software agent for the client, as in the case with 802.1x and EAP, or no software agent, security groups can be used in both cases after client authentication has been performed to deliver its security policies and encryption keys to its PEP.

Security groups can also leverage other existing types of enterprise security policies for users, applications and any organizational groups that can be stored, for instance into LDAP servers. In that case, the MAP will just have to input the various members and their associations from that source.

The Group VPN infrastructure can be designed in conjunction with application access, client security access and any types of enterprise security policies defined for users and applications.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead is placed upon illustrating embodiments of the present invention.

FIG. 7 illustrates group management concepts.

DETAILED DESCRIPTION OF THE INVENTION

A description of example embodiments of the invention follows.

Figure 1:
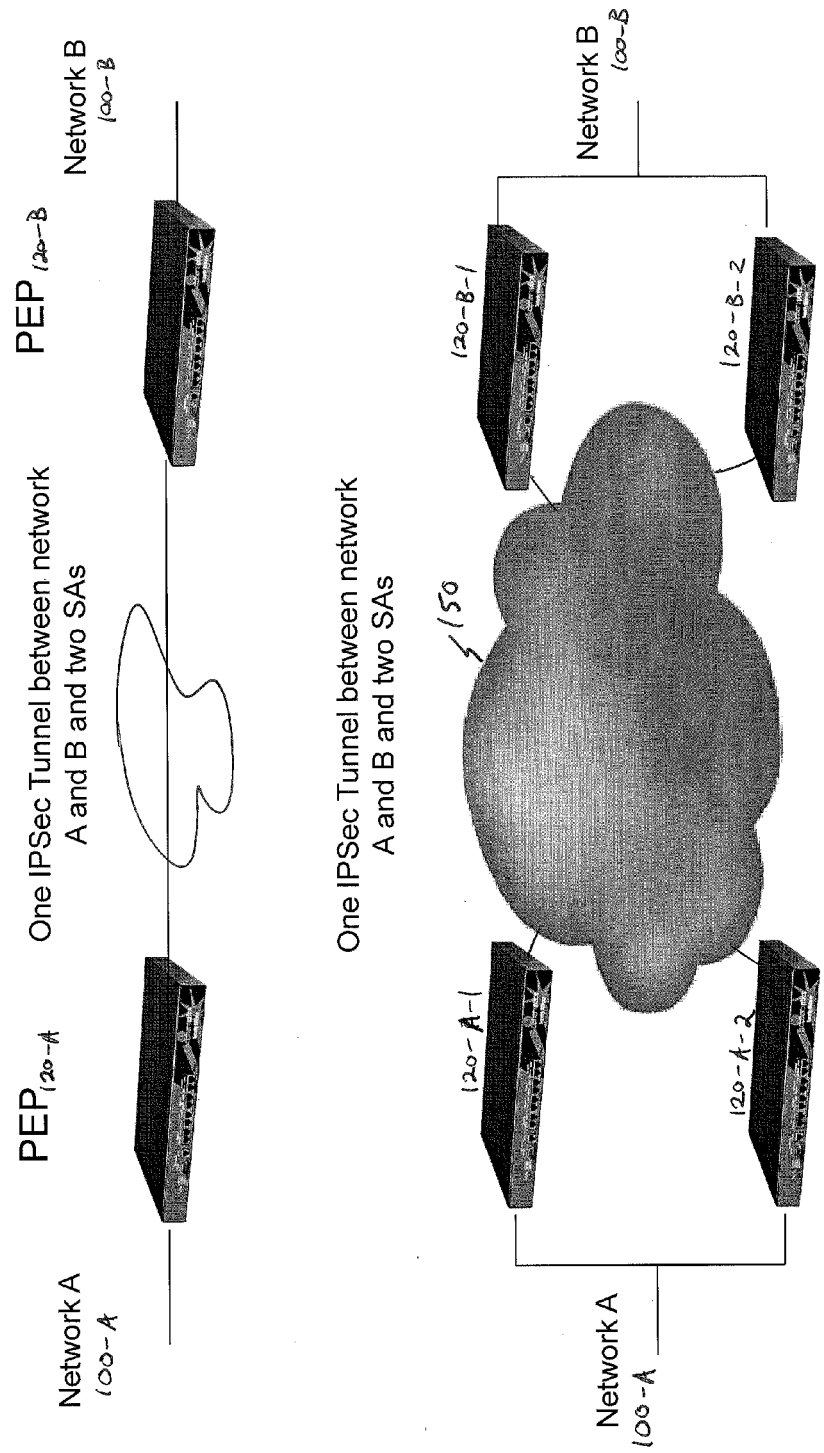
FIG. 1 illustrates the set-up of IPSec tunnels and SAs for two networks, network A and network B, for a case of there being two PEPs (one for each network) and a case where the PEPs for each network need to be redundant.

The diagram in the top half of FIG. 1 illustrates a typical scenario of IPSec using IKE for key generation. IKE phase I provides authentication and a secure channel between the two endpoints. IKE phase II negotiates the IPSec SAs between the two endpoints. These are intended to only operate between two endpoints (Policy Enforcement Points) 120. In other words, IKE is a connection-oriented protocol between two endpoints.

Therefore, using IPSec with IKE for key generation alone does not enable a network 150 to be load-balanced or redundant. In other words, IKE cannot be used between four endpoints if the traffic is expected to be routed equally between each possible pair of endpoints as illustrated in the bottom half of FIG. 1.

The only way to encrypt traffic between two networks, network A (100-A) and network B (100-B) as in FIG. 1, using the point-to-point IPSec Encrypting Security Payload (ESP) would be to establish IPSec SAs that can be used between each possible pair of endpoints 120. The same security policies and encryption keys would be used between each pair of endpoints.

Figure 2:
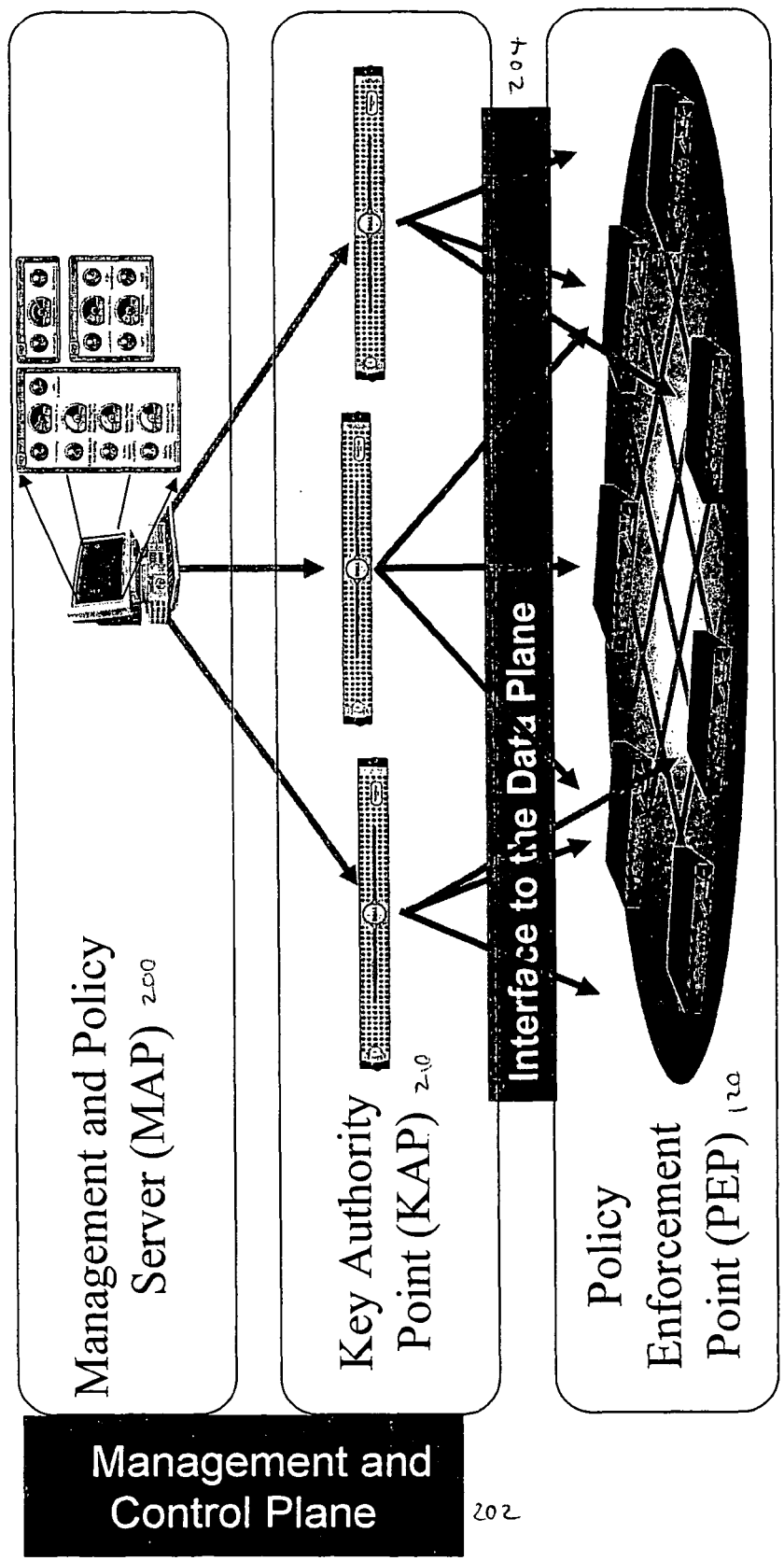
FIG. 2 illustrates a network overlay of the management and control plane to the data plane for the generation of the security policies and encryption keys.

This could lead to the solution provided in FIG. 2, where security policies and encryption keys overlay the data plane 204 for the encryption. In other words, in this approach, the management and control plane 202 does not physically coexist with the data plane 204.

One layer provides the security policies that can be viewed as the management plane. Another layer provides the encryption keys that can be viewed as the control plane. Encryption keys are generated according to the security policies.

In the preferred architecture, the device providing the security policy is called a Management Authority Point (MAP) 200, whereas the device providing the encryption keys is called a Key Authority Point (KAP) 210.

The MAP 200 interfaces to the KAP 210 that interfaces itself to the PEP 120.

The KAP 210 can be redundant. All policies and keys can be securely stored and distributed. Policies for re-key can be clearly enabled. Each node (MAP, KAP and PEP) should be securely authenticated and authorized to accomplish its function.

Figure 3:
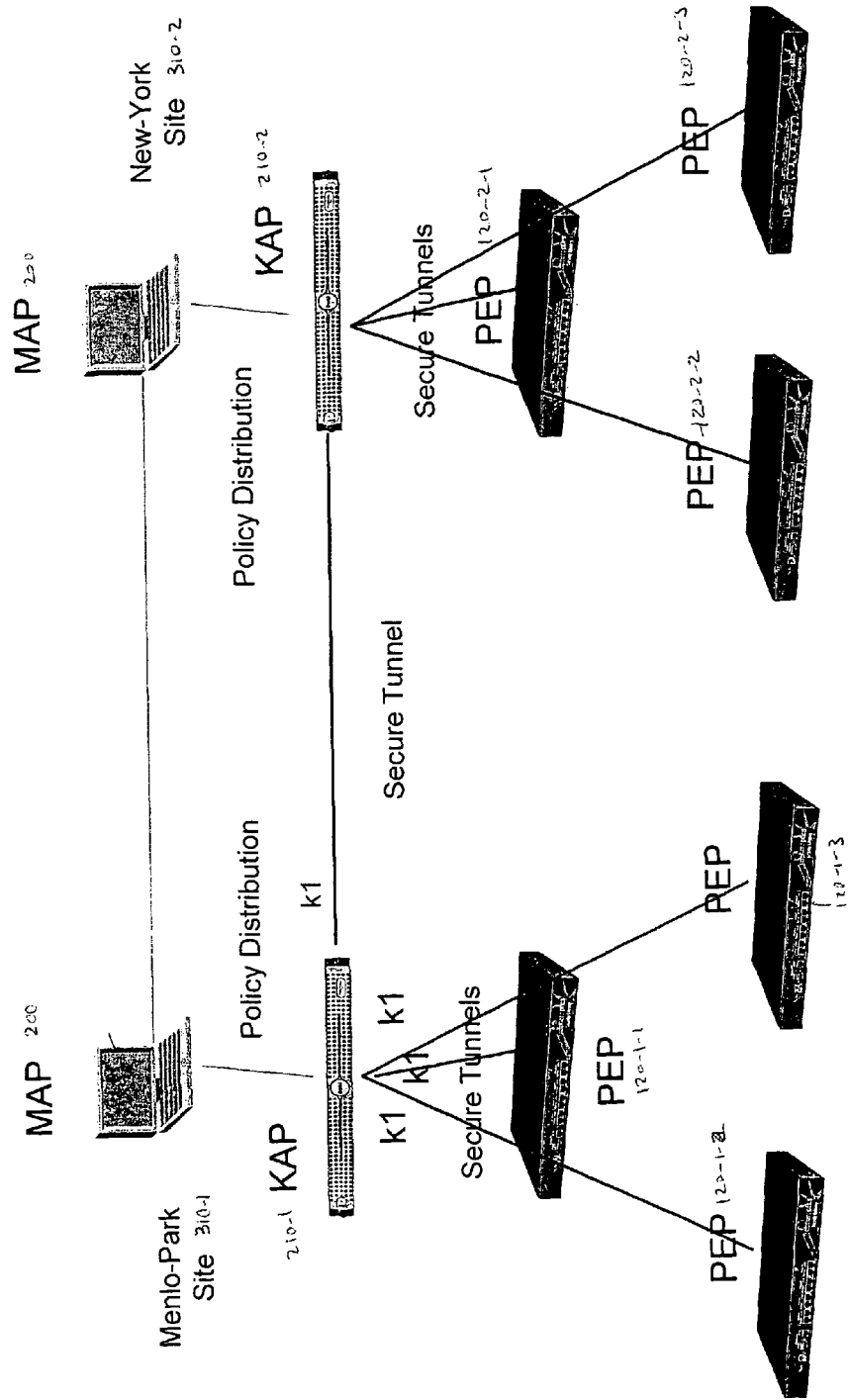
FIG. 3 illustrates how a KAP for a security group, whose policy is defined by a MAP, generates each key and distributes the key to its PEP and its peer KAPs.

Applying the concepts developed in FIG. 2 leads us to FIG. 3 which describes a preferred implementation of policies and key exchanges between remote PEPs 120.

In FIG. 3, a KAP 210-1 located at a first site, such as in Menlo Park, Calif. (site 310-1), generates the outbound encryption keys for the PEPs (120-1, 120-2, 120-3) located at the Menlo Park site. The KAP 210-2 located at a site in New York 310-2 generates the outbound encryption keys for the PEPs (120-2-1, 120-2-2, 120-2-3) located at the New York site 310-2. The Menlo Park site's KAP 210-1 distributes its PEP outbound encryption keys to the New York site's KAP 210-2 which then distributes them to the New York site PEPs (120-2). The New York site's KAP 210-2 does the same for the Menlo Park KAP 210-1. The outbound PEP keys for the Menlo Park site 310-1 become the inbound keys for the New York site 310-2. Similarly, the outbound keys for the New York 310-2 site become the inbound keys for the Menlo Park site 310-1.

For each IP address or subnet connected to a PEP 120, policies are defined by the MAP 200 and distributed to the KAP 210. As defined in the IPSec standard, policies can be encryption, clear or drop policies.

Traffic through a PEP 120 is essentially the same as traffic through any other IPSec appliance, except that on outbound traffic the source and destination IP addresses can be copied from the original, unencrypted packet.

Now, assume that different remote IP addresses and subnets belong to one security group, and for that group, policies and keys are specific.

Figure 4:
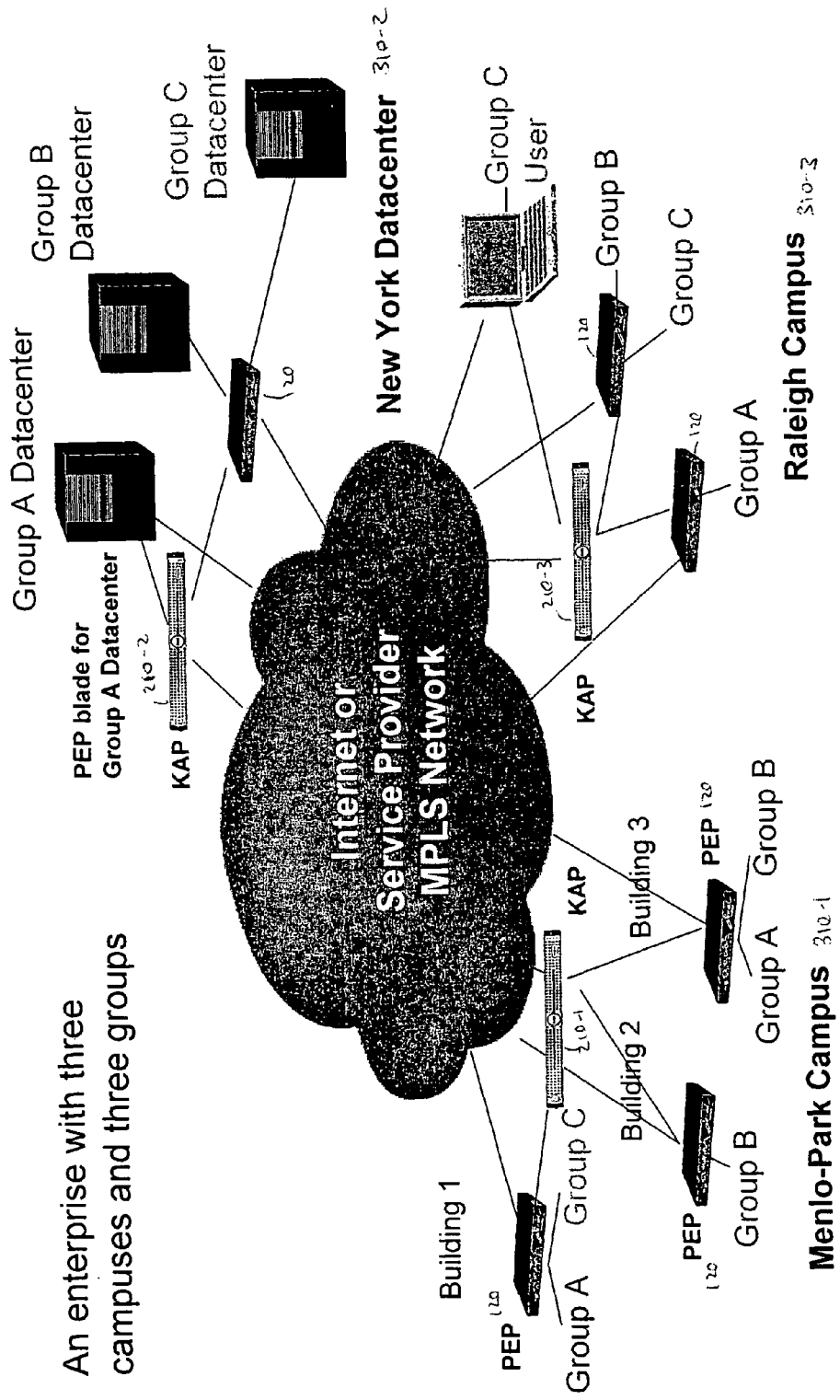
FIG. 4 illustrates a Group VPN network reference design for multiple security groups disseminated over multiple enterprise sites.

As an example, FIG. 4 defines three groups, group A, group B and group C. Two members of group VPN A exist in the Menlo Park campus (site) 310-1, and one group A member exist in the New York site 310-2 and one member of group A in the Raleigh campus site 310-3. Other groups (group B and group C) also have various members at the different sites.

Each member of a group uses the same outbound encryption keys generated and distributed by its local KAP 210.

KAPs 210 exchange outbound keys between themselves, and distribute them to their PEPs 120 as described previously in FIG. 3.

Security group knowledge is defined in the MAP 200 (which may be distributed or not) and shared between MAPs 200. Each MAP 200 knows in its site domain, the IP addresses and/or subnets that are part of a given security group. Therefore, each MAP 200 can trigger its associated KAPs 210 to exchange keys for any given security group with other KAPs 210 that have group members of the same security group.

Since encryption keys can be exchanged without knowledge of the physical location of group members, these Group VPNs scale quite well in networks with complex boundaries. In particular, Group VPNs can scale well for large enterprise networks with numerous remote sites and/or international sites where group member locations can change often, but where group membership changes less frequently.

Therefore, Group VPNs significantly reduce the complexity of the network design and management.

Security groups can accommodate various types of users, such as remote and external users, without any change to the overall architecture. Remote users can connect to their respective PEP 120 as if they were connected to their LANs. For instance, a KAP 210 could be dedicated to remote access clients.

External users can be prevented to have full network access inside the enterprise. External users can be a specific group and can have a protected connection to the Internet.

Figure 5:
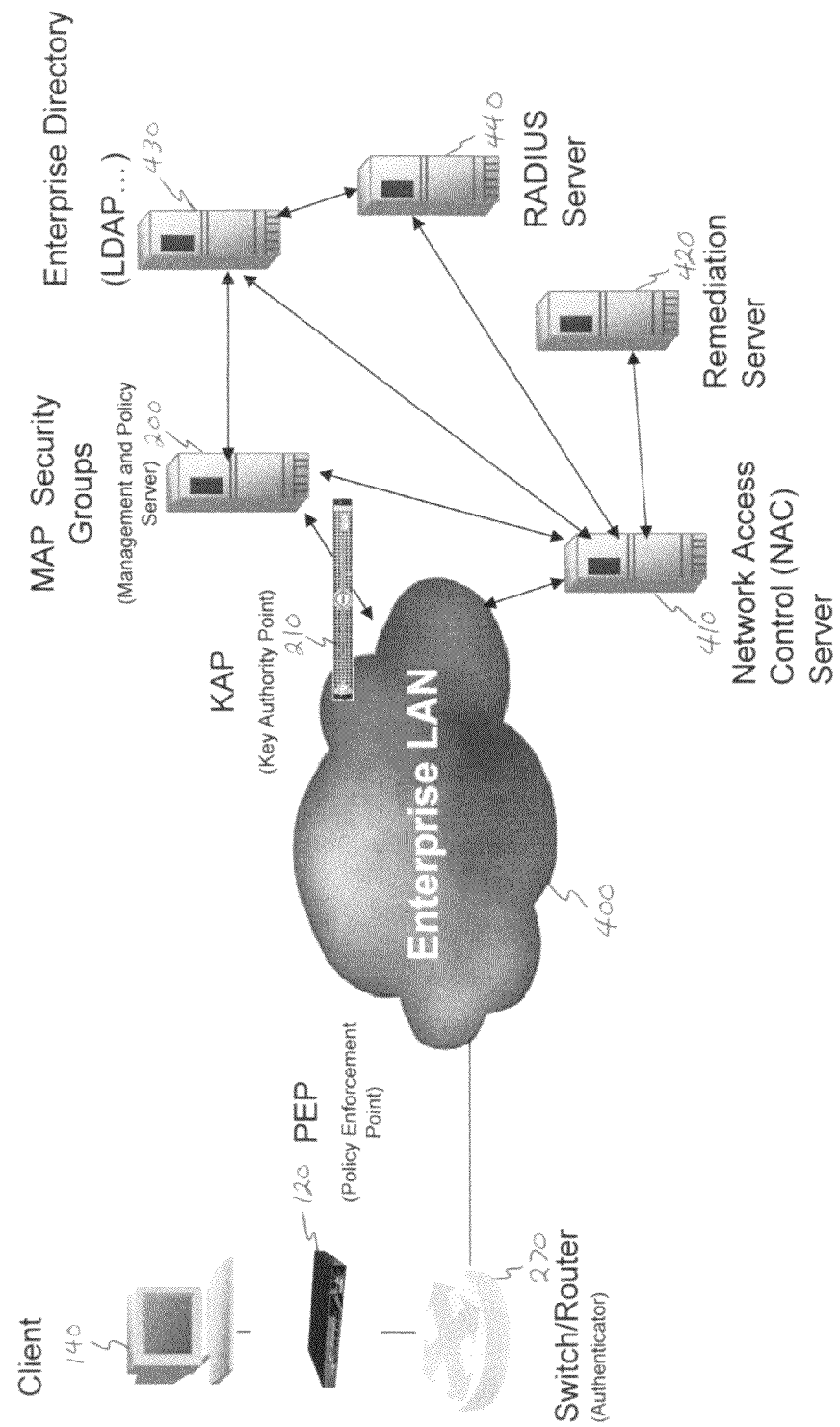
FIG. 5 illustrates how security groups can be linked to existing organizational groups from a LDAP server. It also demonstrates how security policies and encryption keys can be given to a client after control of its access and remediation procedure has been performed.

Ideally when deploying Group VPNs, network access are enforced since security policies and encryption keys must be giving to trusted points in the network. As shown in FIG. 5, certain switching software allows managers to authenticate users and devices as they attempt to connect to a local network. One common mechanism is IEEE 802.1x with the EAP protocol.

801.1x requires a client software called supplicant. Most 802.1x implementations use RADIUS servers for authentication of user names and passwords. Generally, RADIUS servers communicate with enterprise LDAP directory servers 430 to allow the same user names and passwords to be used both for desktop and network access.

When a client user logs into an Ethernet switch, via 802.1x, the switch 270 communicates with the Network Access Control (NAC) server 410. The NAC server 410 routes that information to a RADIUS server 440 to check the user client credentials. When the RADIUS server authenticates the client, the NAC server 410 verifies that the client 140 is in sync with the security policies. If not, the client 140 is routed to the remediation server 420 to get the required software upgrades to meet the security policies.

The client user PEP 120 will need to acquire its security policies and encryption keys from its associated KAP 210 after the client 140 is given permission to access the network and acquire its IP address from a DHCP server (not shown). This is before they can send or receive data that needs encryption.

In order to achieve that, the RADIUS server and/or the enterprise LDAP directory server 430 will share the client security group user memberships. Both the NAC server 410 and the MAP 200 are also linked to provide the same security group memberships.

When the NAC server 410 allows the client 140 network access, it shall inform the MAP 200 so that the MAP 200 can trigger the KAP 210 to provide to the PEP 120 associated with the client user 140 the necessary encryption keys and the security policies.

Security groups can leverage other existing types of enterprise security policies for user and application access control for any functional and/or organizational groups that can be stored in enterprise LDAP directory servers 430. In that case, the MAP 200 will just have to input the various members and their associations for the application access control from the source, as its does for client network access control.

Figure 6:
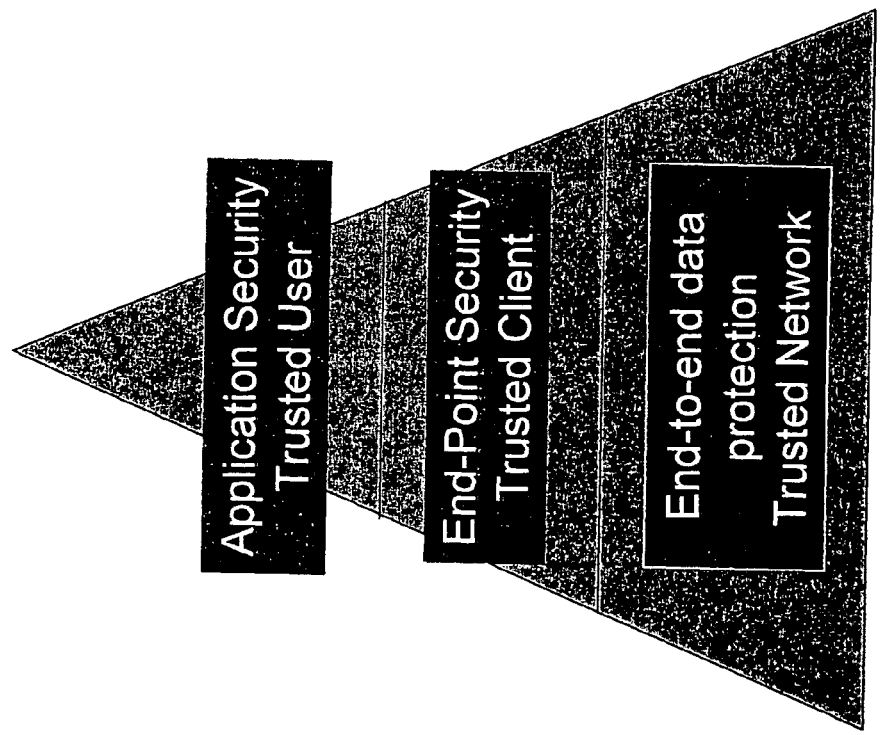
FIG. 6 illustrates the three layers (network, endpoint and application), that need to be trusted in order to establish a secure communication.

As shown in FIG. 6, one preferred security approach is to have a trusted network that provides end-to-end data protection with:
  Endpoint network access control that provides a trusted client; and,
  Application security that provides a trusted user.

As shown in FIG. 7, security groups can be defined at various levels, using questions such as:
  Who needs data protection?
    Users, applications and/or organizations.
  What needs to be protected?
    Data, networks, applications and/or datacenters.
  When does data protection need to be triggered?
    What are the conditions and the life cycle?
  How to provide who, what and when?
    What are the enterprise policies associated with functional and/or organizational roles and/or privileges.

The Group VPN infrastructure can be designed in conjunction with application and client security access and any type of enterprise security policies defined for users and applications as proposed.

While this invention has been particularly shown and described with references to example embodiments thereof, it will be understood by those skilled in the art that various changes in form and details may be made therein without departing from the scope of the invention encompassed by the appended claims.

What is claimed is:

1. A method for providing secure communication among members in a virtual private network comprising:
  defining a security group, the security group comprising identification of two or more members to be enabled to securely communicate with one another, the two or more members being protected by two or more respective policy enforcement points; and
  upon request by a group member to communicate with other members of a security group,
    determining if the group member is authenticated using a virtual private network (VPN) authentication function; and
    if the group member is authenticated by the VPN authentication function, presenting the group member with a security association to enable the member to carry out secure communication within the group, the security association being provided by a network overlay including (i) a key authority point, with respect to the policy enforcement points, that is triggered upon the authentication of the member to distribute the security association to the policy enforcement point associated with the member, and (ii) a management and policy server, separate from the key authority point, that (a) maintains information related to security group, (b) generates and distribute at least one security policy to the key authority point, and (c) triggers the key authority point, upon the authentication of the member, to provide to the policy enforcement point associated with the member at least one encryption key.

2. The method of claim 1 wherein security groups are defined across physically distributed network sites without restriction on group members' physical locations.

3. The method of claim 1 wherein secure communication between group members uses an IPSec protocol.

4. The method of claim 3 wherein communication between group members uses IPsec packets where an original IP packet header is sent in the clear and an IP packet payload is sent in encrypted form.

5. The method of claim 1 wherein security group members are defined by a method selected from a group consisting of
- user clients to user clients, as defined by subnets/IP addresses to subnets/IP addresses;
- clients to host applications/datacenters, as defined by subnets/IP addresses to IP addresses; or
- host applications/datacenters to applications/datacenters, as defined by IP addresses to IP addresses.

6. The method of claim 1 wherein security groups are defined as internal, external or remote.

7. The method of claim 1 wherein a group member belongs to more than one security group.

8. The method of claim 1 wherein the step of determining if the group member is authenticated is additionally integrated with Group VPN access control.

9. The method of claim 1 wherein security groups are integrated with enterprise security policies for users and applications, for organizational, or for functional groups.

10. The method of claim 1 wherein determining if the group member is authenticated further comprises:
- forwarding an authentication request to a Network Access Control (NAC) server.

11. The method of claim 10 further comprising:
- at the NAC, accessing a RADIUS server, to authenticate the group member to the VPN.

12. The method of claim 1, wherein the security association is generated by the key authority point based at least in part on the at least one security policy distributed by the management and policy server.

13. The method of claim 1, wherein the management and policy server further triggers the key authority point to exchange encryption keys for the security group with at least one other key authority point serving at least one group member of the security group.

14. An apparatus for providing secure communication among members in a virtual private network (VPN) comprising:
- a security group storage device, for storing a definition of a security group, the security group comprising an identification of two or more members of the VPN to be enabled to securely communicate with one another, the two or more members being protected by two or more respective policy enforcement points;
- a receiver, for receiving a request by a group member to communicate with other members of a security group;
- a virtual private network (VPN) authentication server, for determining if the group member is authenticated; and
- a security association interface, for receiving a security association to enable an authenticated member to carry out secure communication with other group members, the interface receiving the security association through a network overlay including (i) a key authority point, with respect to the policy enforcement points, that is triggered upon the authentication of the group member to distribute the security association to the policy enforcement point associated with the group member, and (ii) a management and policy server, separate from the key authority point, configured to (a) maintain information related to security group, (b) generate and distribute at least one security policy to the key authority point, and (c) trigger the key authority point, upon the authentication of the member, to provide to the policy enforcement point associated with the member at least one encryption key.

15. The apparatus of claim 14 wherein security groups are defined across physically distributed network sites without restriction on group members' physical locations.

16. The apparatus of claim 14 wherein secure communication between group members uses an IPSec protocol.

17. The apparatus of claim 16 wherein communication between group members uses IPsec packets where an original IP packet header is sent in the clear and an IP packet payload is sent in encrypted form.

18. The apparatus of claim 14 wherein security group members are selected from a group consisting of
- user clients to user clients, as defined by subnets/IP addresses to subnets/IP addresses;
- clients to host applications/datacenters, as defined by subnets/IP addresses to IP addresses; or
- host applications/datacenters to applications/datacenters, as defined by IP addresses to IP addresses.

19. The apparatus of claim 14 wherein security groups are defined as internal, external or remote.

20. The apparatus of claim 14 wherein a group member belongs to more than one security group.

21. The apparatus of claim 14 wherein the VPN authentication server is additionally integrated with a Group VPN access controller.

22. The apparatus of claim 14 wherein security groups are integrated with enterprise security policies for users and applications, for organizational, or for functional groups.

23. The apparatus of claim 14 wherein VPN authentication server further comprises:
- a Network Access Control (NAC) server.

24. The apparatus of claim 23 further comprising:
- a RADIUS server, to authenticate the group member to the NAC.

25. The apparatus of claim 14, wherein the security association is generated by the key authority point based at least in part on the at least one security policy distributed by the management and policy server.

26. The apparatus of claim 14, wherein the management and policy server is configured to further trigger the key authority point to exchange encryption keys for the security group with at least one other key authority point serving at least one group member of the security group.

* * * * *